United States Patent
Pang

(10) Patent No.: US 9,438,666 B2
(45) Date of Patent: Sep. 6, 2016

(54) METHOD AND SYSTEM FOR RESOURCE DOWNLOAD

(71) Applicant: TENCENT TECHNOLOGY (SHENZHEN) COMPANY LIMITED, Shenzhen, Guangdong (CN)

(72) Inventor: Yongqiang Pang, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 292 days.

(21) Appl. No.: 14/130,422

(22) PCT Filed: Feb. 26, 2013

(86) PCT No.: PCT/CN2013/071865
§ 371 (c)(1),
(2) Date: Dec. 31, 2013

(87) PCT Pub. No.: WO2013/143367
PCT Pub. Date: Oct. 3, 2013

(65) Prior Publication Data
US 2014/0149556 A1    May 29, 2014

(30) Foreign Application Priority Data
Mar. 30, 2012    (CN) .......................... 2012 1 0090423

(51) Int. Cl.
*G06F 15/16* (2006.01)
*H04L 29/08* (2006.01)

(52) U.S. Cl.
CPC ............. *H04L 67/10* (2013.01); *H04L 67/108* (2013.01)

(58) Field of Classification Search
USPC ......................... 709/219, 201, 202, 203, 217
See application file for complete search history.

(56) References Cited

U.S. PATENT DOCUMENTS

| | | | |
|---|---|---|---|
| 8,788,519 B2 * | 7/2014 | Canessa ................. G06F 15/16 707/722 |
| 2010/0195513 A1 * | 8/2010 | Yang .................... H04L 63/0254 370/252 |
| 2011/0258277 A1 | 10/2011 | Hu |

FOREIGN PATENT DOCUMENTS

| CN | 101719936 | 6/2010 |
|---|---|---|
| CN | 102055786 | 5/2011 |
| CN | 102685160 | 9/2012 |

* cited by examiner

*Primary Examiner* — Lan-Dai T Truong
(74) *Attorney, Agent, or Firm* — Nixon & Vanderhye P.C.

(57) ABSTRACT

A method for resource download includes steps of: obtaining a download link of a download resource and querying a hash server whether or not stores with a full-text hash of a resource file corresponding to the download link; downloading a head data of the resource file via a source server and calculating a head hash of the resource file if the hash server does not store with the full-text hash of the resource file corresponding to the download link; and adopting a respective download strategy based on whether or not the hash server stores with the full-text hash of the resource file corresponding to the head hash. A system for resource download is also provided.

16 Claims, 10 Drawing Sheets

METHOD AND SYSTEM FOR RESOURCE DOWNLOAD

This application is the U.S. national phase of International Application No. PCT/CN2013/071865, filed 26 Feb. 2013, which designated the U.S. and claims priority to CN Application No. 201210090423.8, filed 30 Mar. 2012, the entire contents of each of which are hereby incorporated by reference.

TECHNICAL FIELD

The present invention relates to a field of communication technology, and more particularly to method and system for resource download.

BACKGROUND

At present, Peer to Server &Peer (P2SP) has become the mainstream way for users to download resources. In P2SP download, when needing to download a resource file corresponding to a download link (i.e., Uniform Resource Locator (URL)), a peer can perform the Peer to Peer (P2P) download from other Peers for the resource file and even fasten the P2P by querying other download links URLs of the resource file. In the aforementioned P2SP download, the resource file can be downloaded faster by referring the full-text hash of the resource file as the unique identifier of the resource. Thus, how to get the full-text hash of the resource more efficiently and thereby having a faster P2P and P2SP downloads is an important issue. In the current technology, the corresponding relationship between the download link URL and the full-text hash of a to-be-downloaded resource file is looked up based on the corresponding relationships between the download links URLs and the full-text hashes of all resource files stored in a server.

However, to prevent the resource file, such as the online video resource files, from being downloaded illegally, some web sites may use the varying download link URL. By frequently changing the download link URL, the download client can only get the full-text hash corresponding to the non-latest download link URL, and accordingly the download client cannot have a faster P2SP download.

In summary, the download client cannot query the full-text hash of the resource file corresponding to the varying download link URL in the existing technology, and consequentially download client cannot have a faster P2SP download.

SUMMARY OF EMBODIMENTS

Therefore, an object of the present invention is to provide method and system for resource download to solve the issue of fail to having a P2SP download, which is resulted from failing to query the full-text hash of the resource file corresponding to the varying download link URL.

The present invention provides a method for resource download, which includes steps of: obtaining a download link of a download resource and querying a hash server whether or not stores with a full-text hash of a resource file corresponding to the download link; downloading a head data of the resource file via a source server and calculating a head hash of the resource file if the hash server does not store with the full-text hash of the resource file corresponding to the download link; and adopting a respective download strategy based on whether or not the hash server stores with the full-text hash of the resource file corresponding to the head hash.

The present invention further provides a system for resource download, which includes a link obtaining unit, a querying unit, a download unit and a calculation unit. The link obtaining unit is configured to obtain a download link of a download resource. The querying unit is configured to query a hash server whether or not stores with a full-text hash of a resource file corresponding to the download link and query the hash server whether or not stores with the full-text hash of the resource file corresponding to a head hash thereof. The download unit is configured to, if the hash server does not store with the full-text hash of the resource file corresponding to the download link, download a head data of the resource file via a source server and adopt a respective download strategy based on whether or not the hash server stores with the full-text hash of the resource file corresponding to the head hash. The calculation unit is configured to calculate the head hash of the resource file downloaded by the download unit.

The embodiment of the present invention first obtains a download link URL and queries whether or not the hash server stores with the full-text hash of the resource file corresponding to the download link URL. If the hash server does not store with the full-text hash of the resource file corresponding to the download link URL, the present embodiment downloads the head data of the resource file via the source server and calculates the head hash of the resource file, and thereby adopting a respective download strategy based on whether or not the hash server stores with the full-text hash of the resource file corresponding to the head hash. Thus, without quarrying and obtaining the full-text hash of the resource file corresponding to the varying download link, the system for resource download in this embodiment can adopt a respective download strategy by quarrying whether or not the hash server stores with the head hash and the full-text hash of the resource file corresponding to the data length of the resource file due to the head hash of the resource file is always without change, and thereby facilitating the download of the same resource. Accordingly, the user account is guaranteed to be capable of performing an effective P2SP based on the full-text hash of the resource file obtained by the head thereof.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

In the present invention, if the hash server does not store with the full-text hash of the resource file corresponding to the download link URL, the embodiment of the present invention downloads the head data of the resource file, calculates the head hash of the resource file, queries the server to obtain the full-text hash of the resource file corresponding to the head hash, and performs the P2SP download according to the full-text hash of the resource file corresponding to the head hash.

One embodiment of the present invention provides a method for resource download, which includes steps of: obtaining a download link of a download resource and querying a hash server whether or not stores with a full-text hash of a resource file corresponding to the download link; downloading a head data of the resource file via a source server and calculating a head hash of the resource file if the hash server does not store with the full-text hash of the resource file corresponding to the download link; and adopting a respective download strategy based on whether or not the hash server stores with the full-text hash of the resource file corresponding to the head hash.

Another embodiment of the present invention provides a system for resource download, which includes: a link obtaining unit configured to obtain a download link of a download resource; a querying unit configured to query a hash server whether or not stores with a full-text hash of a resource file corresponding to the download link and query the hash server whether or not stores with the full-text hash of the resource file corresponding to a head hash thereof; a download unit configured to, if the hash server does not store with the full-text hash of the resource file corresponding to the download link, download a head data of the resource file via a source server and adopt a respective download strategy based on whether or not the hash server stores with the full-text hash of the resource file corresponding to the head hash; and a calculation unit configured to calculate the head hash of the resource file downloaded by the download unit.

First Embodiment

Figure 1:
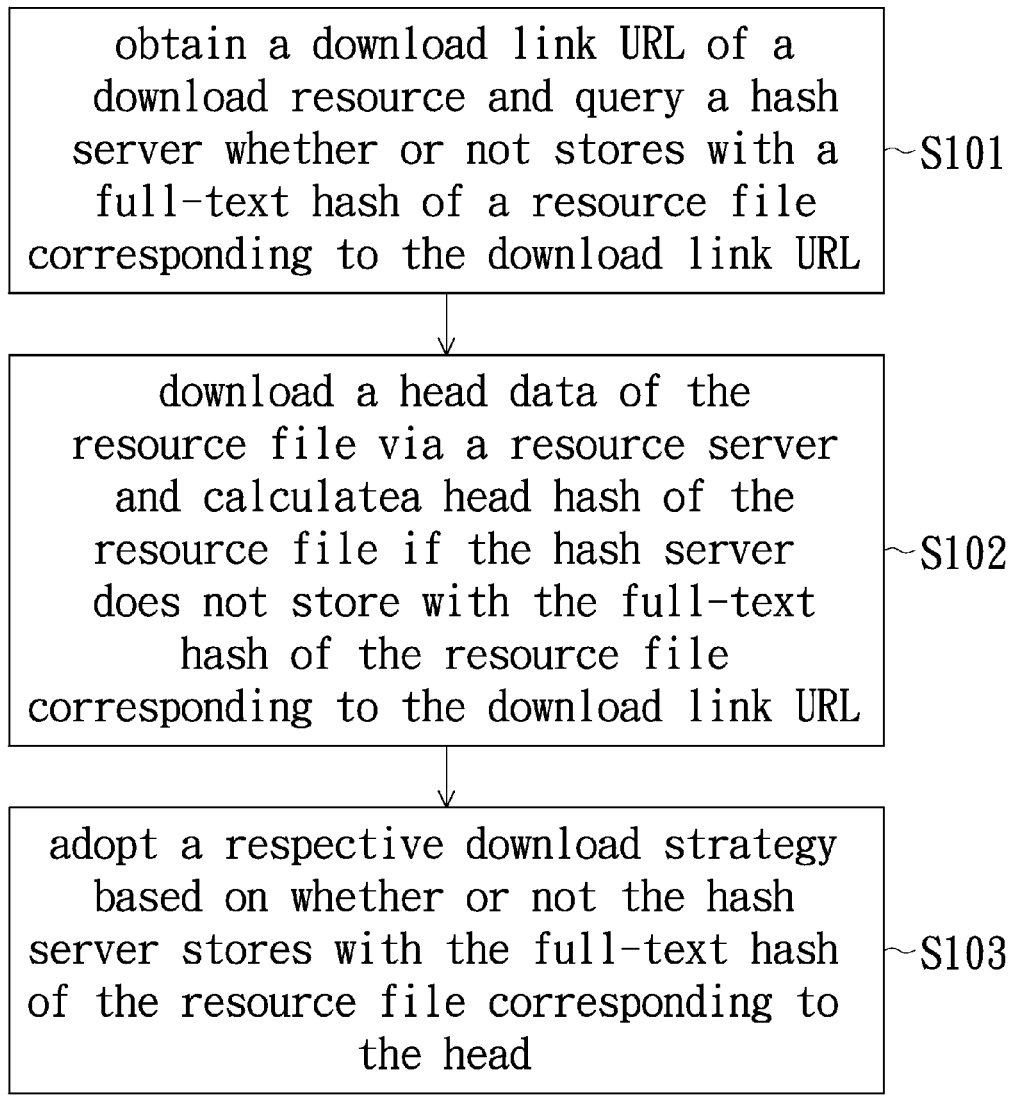
FIG. 1 is a flowchart illustrating a method for resource download in accordance with the first embodiment of the present invention.

FIG. 1 is a flowchart illustrating a method for resource download in accordance with the first embodiment of the present invention. The method will be described in follows.

In step S101: obtaining a download link URL of a download resource and querying a hash server whether or not stores with a full-text hash of a resource file corresponding to the download link URL.

In one embodiment, a P2SP download is performed according to the full-text hash of the resource file corresponding to the download link URL if the hash server stores with the full-text hash of the resource file corresponding to the download link URL.

In step S102: downloading head data of the resource file via a source server and calculating a head hash of the resource file if the hash server does not store with the full-text hash of the resource file corresponding to the download link URL.

In one embodiment, the head data of the resource file is referred to as the data with a specific data length from the beginning of the to-be-obtained resource. For example, the first 128K data of a to-be-obtained resource file is referred to as the head data thereof. In addition, the head hash of the resource file is the head hash of the head data which is obtained by performing the Hash algorithm on the head data of the resource; wherein the Hash algorithm is, for example, md4, md5, sha1 or sha2, and the present invention is not limited thereto.

In step S103: adopting a respective download strategy based on whether or not the hash server stores with the full-text hash of the resource file corresponding to the head hash.

In one embodiment, the hash server stores with the corresponding relationship between the download link URL and the full-text hash of the resource file and the corresponding relationship between the head hash and the full-text hash of the resource file.

The present embodiment first obtains a download link URL and queries whether or not the hash server stores with the full-text hash of the resource file corresponding to the download link URL. If the hash server does not store with the full-text hash of the resource file corresponding to the download link URL, the present embodiment downloads the head data of the resource file via the source server and calculates the head hash of the resource file, and thereby adopting a respective download strategy based on whether or not the hash server stores with the full-text hash of the resource file corresponding to the head hash. Thus, without quarrying and obtaining the full-text hash of the resource file corresponding to the varying download link, the system for resource download in this embodiment can adopt a respective download strategy by quarrying whether or not the hash server stores with the head hash and the full-text hash of the resource file corresponding to the data length of the resource file due to the head hash of the resource file is always without change, and thereby facilitating the download of the same resource. Accordingly, the user account is guaranteed to be capable of performing an effective P2SP based on the full-text hash of the resource file obtained by the head thereof.

Second Embodiment

Figure 2A:
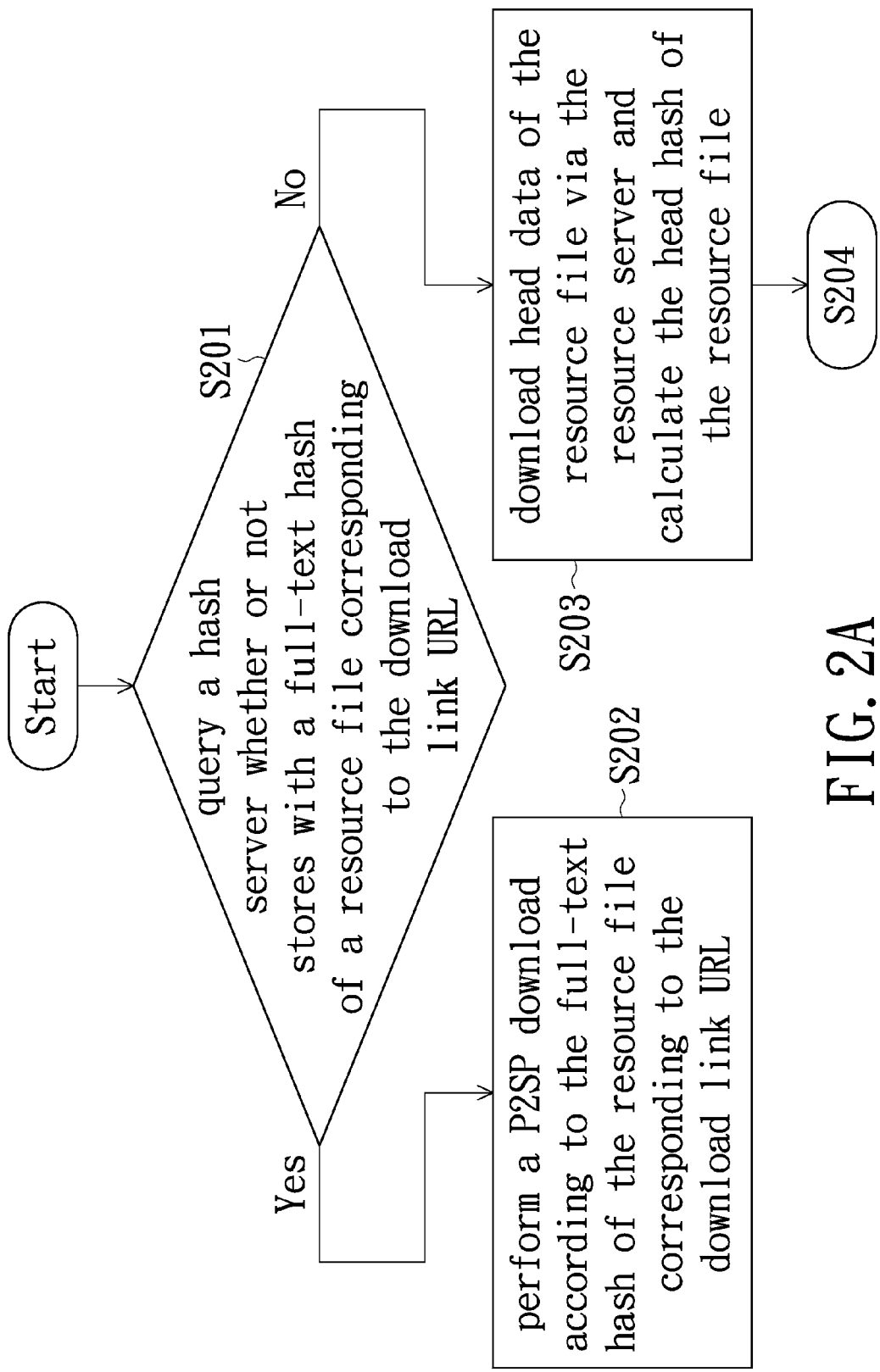
FIG. 2 is a flowchart illustrating a method for resource download in accordance with the second embodiment of the present invention.
Figure 2B:
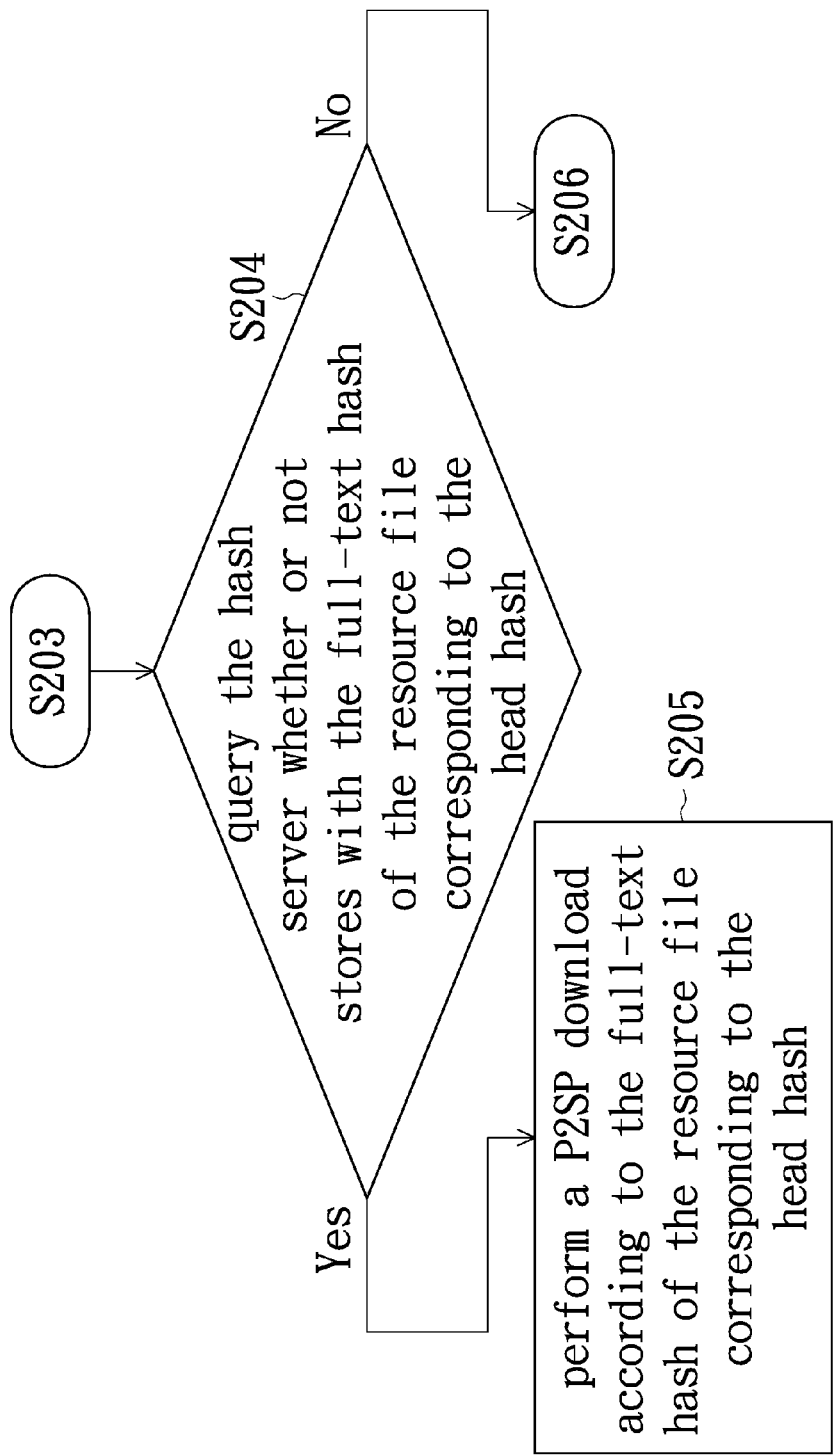
Figure 2C:
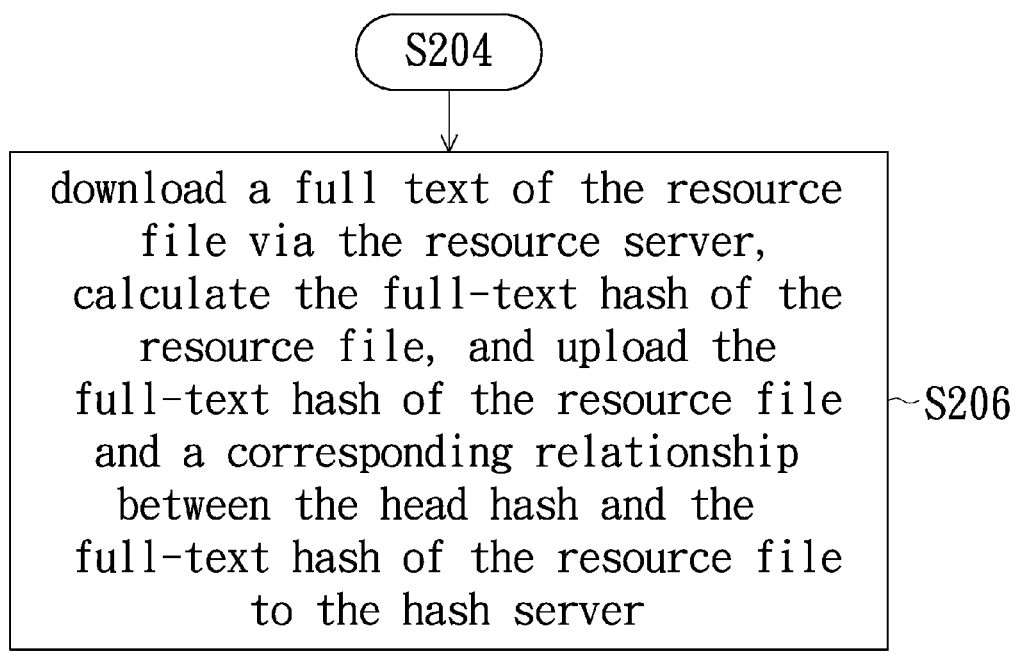

FIG. 2 is a flowchart illustrating a method for resource download in accordance with the second embodiment of the present invention. The method will be described in follows.

In step S201, obtaining a download link URL of a download resource and querying a hash server whether or not stores with a full-text hash of a resource file corresponding to the download link URL. Specifically, the method in this embodiment moves to step S202 if the hash server stores with the full-text hash of the resource file corresponding to the download link URL; alternatively, the method in this embodiment moves to step S203 if the hash server does not store with the full-text hash of the resource file corresponding to the download link URL.

In step S202: performing a P2SP download according to the full-text hash of the resource file corresponding to the download link URL.

In the present embodiment, the process of performing the P2SP download according to the full-text hash of the resource file corresponding to the head hash is specifically realized by: looking up, based on the full-text hash of the resource file corresponding to the head hash, the download link URL and Peer corresponding to the full-text hash in the corresponding relationship between the full-text hash of the resource file and the download link URL and the corresponding relationship between the between the full-text hash and Peer pre-stored in the server; and performing the P2SP download (including P2P and P2S downloads) according to the obtained download link URL and Peer. Because the corresponding relationship between the full-text hash of the resource file and the download link URL and the corresponding relationship between the between the full-text hash and Peer each are one to many, a faster download is realized due to one full-text hash may be corresponding to many download links URLs and Peers.

In step S203: downloading head data of the resource file via a source server and calculating a head hash of the resource file.

In the present and the following embodiments, the mean of calculating the head hash of the resource file can be realized by step S102, and no redundant detail is to be given herein.

In step S204, querying the hash server whether or not stores with the full-text hash of the resource file corresponding to the head hash. Specifically, the method in this embodiment moves to step S205 if the hash server stores with the full-text hash of the resource file corresponding to the head hash; alternatively, the method in this embodiment moves to step S206 if the hash server does not store with the full-text hash of the resource file corresponding to the head hash.

In step S205, performing a P2SP download according to the full-text hash of the resource file corresponding to the head hash.

In the present and the following embodiments, the mean of performing the P2SP download according to the full-text hash of the resource file can be realized by step S202, and no redundant detail is to be given herein.

In step S206, downloading the full text of the resource file via a source server, calculating the full-text hash of the resource file and uploading the full-text hash of the resource file and a corresponding relationship between the head hash and the full-text hash of the resource file to the hash server.

In the present embodiment, if the hash server does not store with the full-text hash of the resource file corresponding to the head hash, not only the full text of the resource file is downloaded via the source server, and the full-text hash of the resource file is still calculated and the downloaded full-text hash of the resource file as well as the corresponding relationship between the head hash and the full-text hash of the resource file are uploaded. Thus, there is no need to perform the download and upload via the source server while other user account is downloading the resource file, and thereby facilitating a more convenient and faster download.

Third Embodiment

Figure 3:
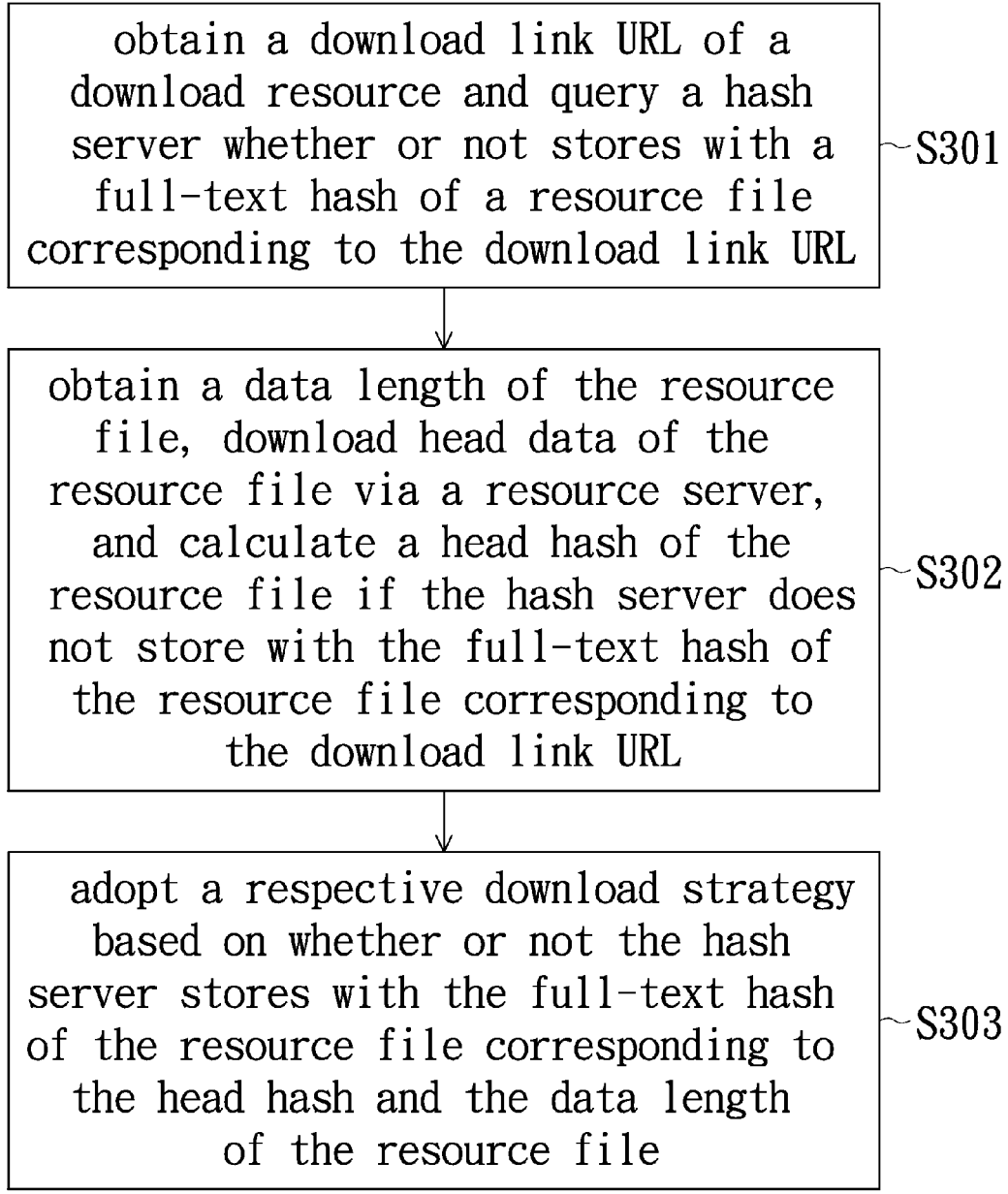
FIG. 3 is a flowchart illustrating a method for resource download in accordance with the third embodiment of the present invention.

FIG. 3 is a flowchart illustrating a method for resource download in accordance with the third embodiment of the present invention. The method will be described in follows.

In step S301: obtaining a download link URL of a download resource and querying a hash server whether or not stores with a full-text hash of a resource file corresponding to the download link URL.

In step S302: obtaining a data length of the resource file, downloading head data of the resource file via a source server and calculating a head hash of the resource file if the hash server does not store with the full-text hash of the resource file corresponding to the download link URL.

In step S303: adopting a respective download strategy based on whether or not the hash server stores with the head hash and the full-text hash of the resource file corresponding to the data length of the resource file.

It is understood that different resource files may have the same head file; and accordingly the situation of two resource files having the same head hash but having different full-text hashes may occur. However, because different resource files have different sizes and different information lengths, the full-text hash of one unique resource file can be identified based on the head hash and the data length of the resource file; wherein the data length of the resource file can be obtained while the head data of the resource file is being downloaded. Thus, the download error as well as the download fail can be prevented from being occurring if there exists two resource files having the different full-text hashes and the same head hash.

Fourth Embodiment

Figure 4A:
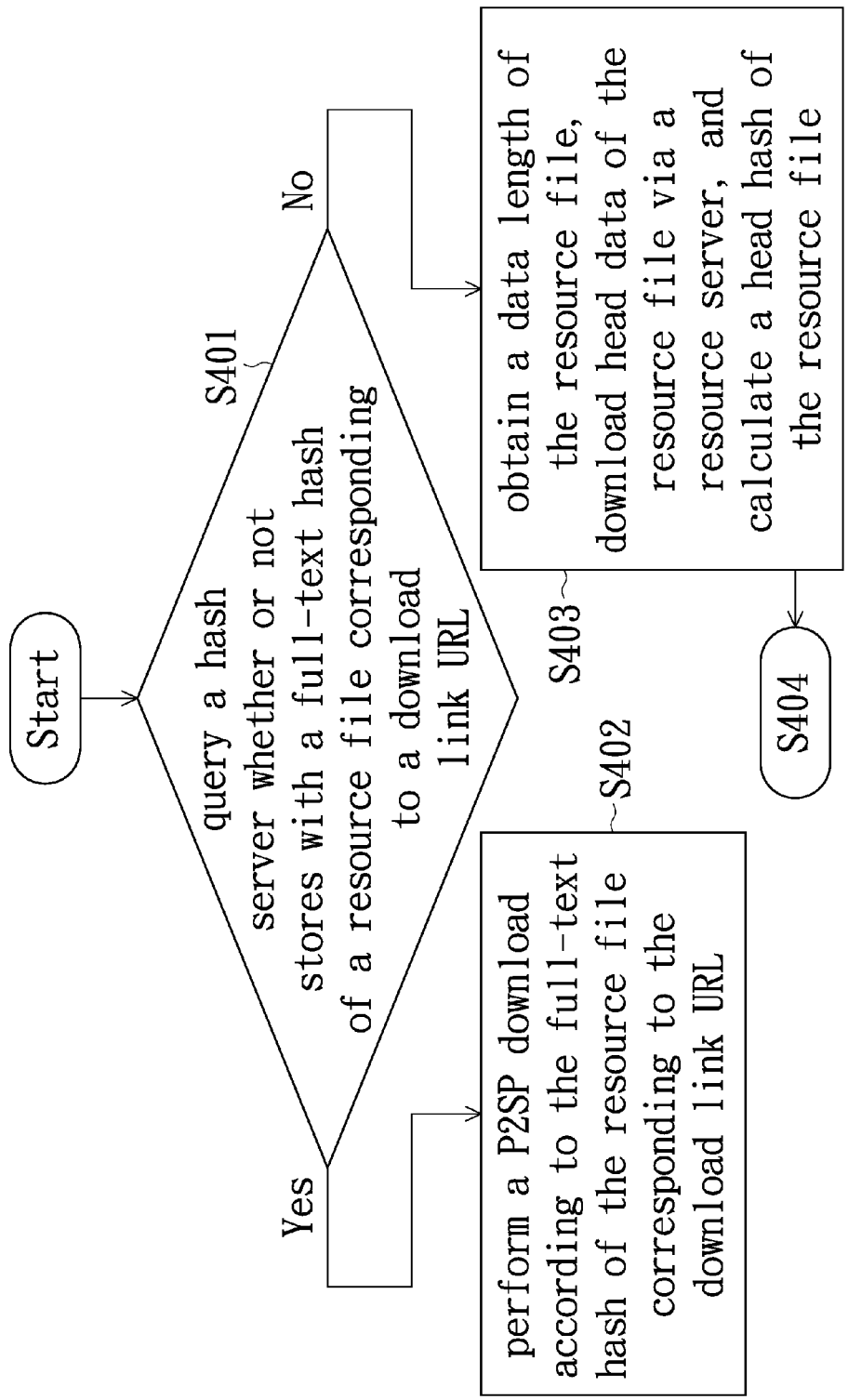
FIG. 4 is a flowchart illustrating a method for resource download in accordance with the fourth embodiment of the present invention.
Figure 4B:
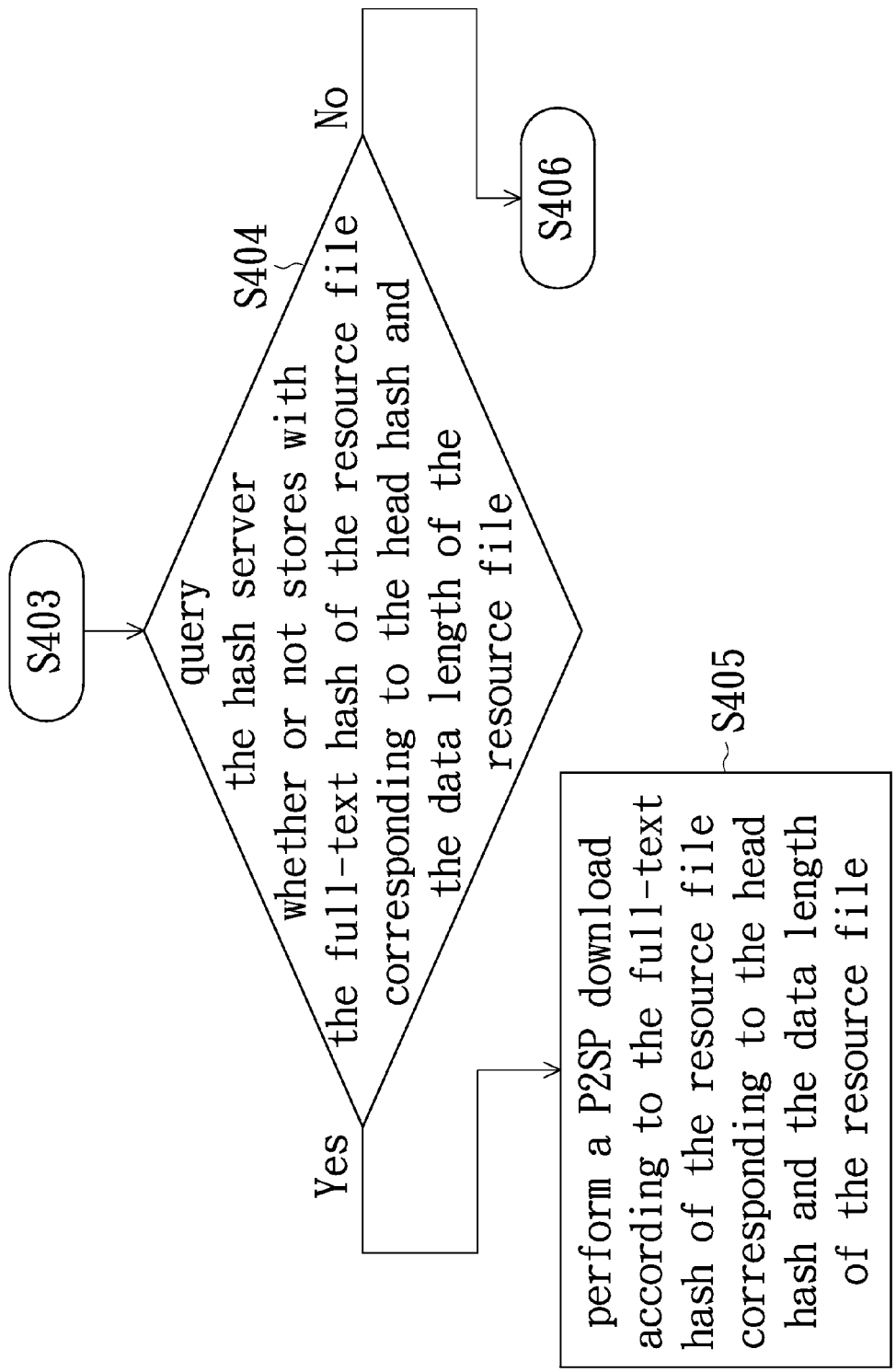
Figure 4C:
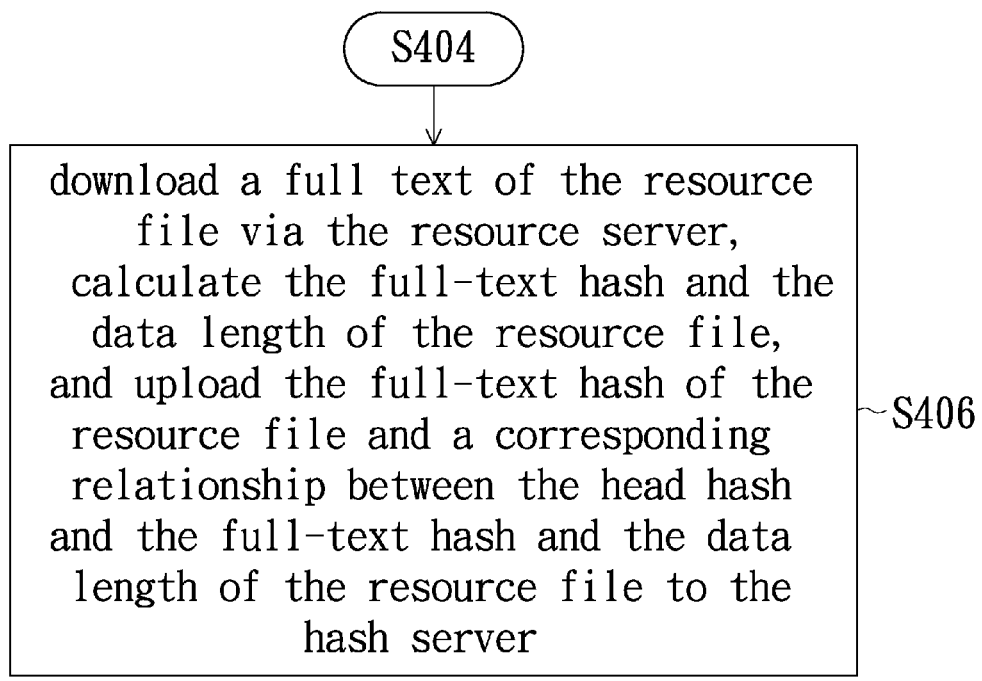

FIG. 4 is a flowchart illustrating a method for resource download in accordance with the fourth embodiment of the present invention. The method will be described in follows.

In step S401, obtaining a download link URL of a download resource and querying a hash server whether or not stores with a full-text hash of a resource file corresponding to the download link URL. Specifically, the method in this embodiment moves to step S402 if the hash server stores with the full-text hash of the resource file corresponding to the download link URL; alternatively, the method in this embodiment moves to step S403 if the hash server does not store with the full-text hash of the resource file corresponding to the download link URL.

In step S402: performing a P2SP download according to the full-text hash of the resource file corresponding to the download link URL.

In step S403: obtaining a data length of the resource file, downloading head data of the resource file via a source server and calculating a head hash of the resource file.

In the present and the following embodiments, the mean of calculating the head hash of the resource file can be realized by step S102, and no redundant detail is to be given herein.

In step S404: querying the hash server whether or not stores with the head hash and the full-text hash of a resource file corresponding to the data length. Specifically, the method in this embodiment moves to step S405 if the hash server stores with the head hash and the full-text hash of the resource file corresponding to the data length; alternatively, the method in this embodiment moves to step S406 if the hash server does not store with the head hash and the full-text hash of the resource file corresponding to the data length.

In step S405: performing a P2SP download according to the head hash and the full-text hash of the resource file corresponding to the data length.

In step S406: downloading the full text of the resource file via a source server, calculating the full-text hash and the data length of the resource file and uploading the full-text hash of the resource file, the head hash and a corresponding relationship between the full-text hash and the data length of the resource file to the hash server.

In the present embodiment, if the hash server does not store with the full-text hash of the resource file corresponding to the head hash, not only the full text of the resource file is downloaded via the source server, and the full-text hash of the resource file is still calculated and the downloaded full-text hash of the resource file as well as the corresponding relationship between the head hash and the full-text hash of the resource file are uploaded. Thus, there is no need to perform the download and upload via the source server while other user account is downloading the resource file, and thereby facilitating a more convenient and faster download.

In this embodiment, if the hash server does not store with the head hash of the resource file and the full-text hash of the resource file corresponding to the data length thereof, the resource is downloaded (e.g., by way of http) by the source server via the download link URL. In addition, after the resource is downloaded, the full-text hash and the data length of the resource file are downloaded and the full-text hash of the resource file, the head hash and the corresponding relationship between the full-text hash and the data length of the resource file are uploaded to the hash server. Thus, there is no need to perform the download and upload via the source server while other user account is downloading the resource file, and thereby facilitating a more convenient and faster download.

Fifth Embodiment

Figure 5:
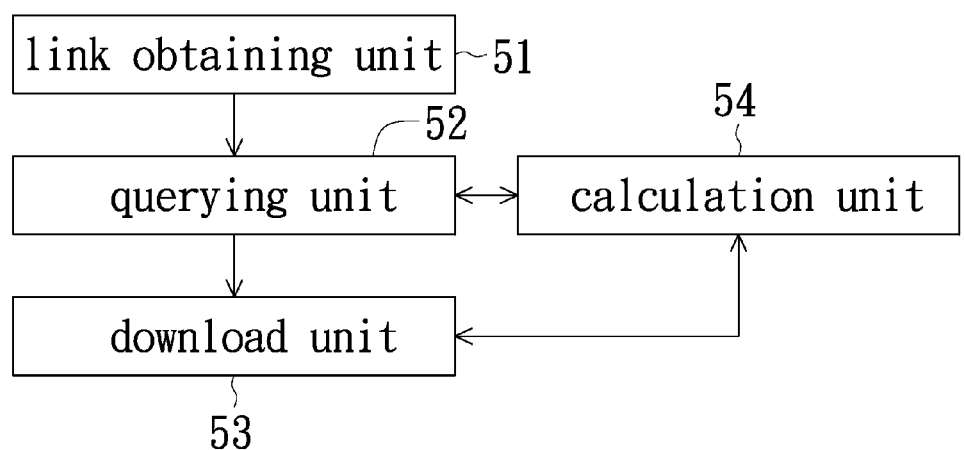
FIG. 5 is a schematic constructive diagram of a system for resource download in accordance with the fifth embodiment of the present invention.

FIG. 5 is a schematic constructive diagram of a system for resource download in accordance with the fifth embodiment of the present invention. In order to facilitate the explanation, only the parts associated with the embodiment of the present invention are shown.

The system in this embodiment includes a link obtaining unit 51, a querying unit 52, a download unit 53 and a calculation unit 54.

The link obtaining unit 51 is configured to obtain a download link URL of a download resource.

The querying unit 52 is configured to query a hash server whether or not stores with a full-text hash of a resource file corresponding to the download link URL and query the hash server whether or not stores with the full-text hash of the resource file corresponding to a head hash thereof.

The download unit 53 is configured to, if the hash server does not store with the full-text hash of the resource file corresponding to the download link URL, download the head data of the resource file via a source server and adopt a respective download strategy based on whether or not the hash server stores with the full-text hash of the resource file corresponding to the head hash.

Optionally, the download unit 53 is further configured to perform a P2SP download according to the full-text hash of the resource file corresponding to the download link URL if the hash server stores with the full-text hash of the resource file corresponding to the download link.

The calculation unit 54 is configured to calculate the head hash of the resource file downloaded by the download unit 53.

Without quarrying and obtaining the full-text hash of the resource file corresponding to the varying download link, the system for resource download in this embodiment can adopt a respective download strategy by quarrying whether or not the hash server stores with the head hash and the full-text hash of the resource file corresponding to the data length of the resource file due to the head hash of the resource file is always without change, and thereby facilitating the download of the same resource. Thus, the user account is guaranteed to be capable of performing an effective P2SP based on the full-text hash of the resource file obtained by the head thereof.

The system for resource download in the present embodiment is adapted to be used to the method disclosed in the aforementioned first embodiment, and no redundant detail is to be given herein.

Sixth Embodiment

Figure 6:
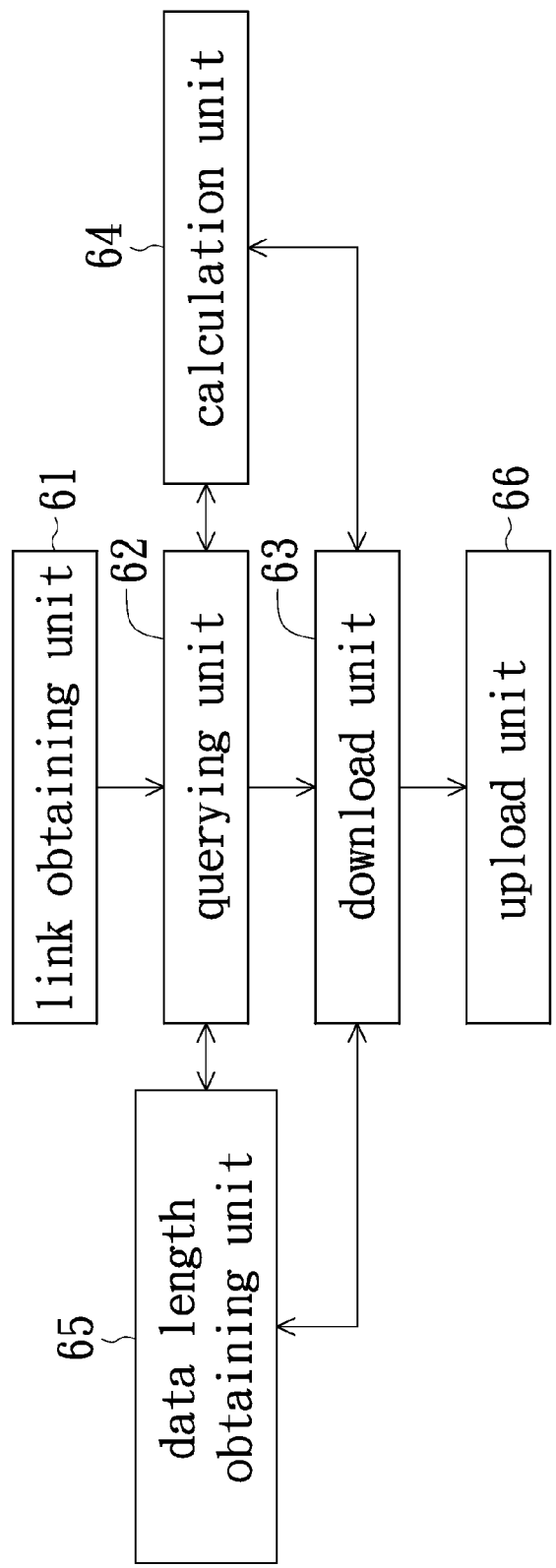
FIG. 6 is a schematic constructive diagram of a system for resource download in accordance with the sixth embodiment of the present invention.

FIG. 6 is a schematic constructive diagram of a system for resource download in accordance with the sixth embodiment of the present invention. In order to facilitate the explanation, only the parts associated with the embodiment of the present invention are shown.

The system in this embodiment includes a link obtaining unit 61, a querying unit 62, a download unit 63, a calculation unit 64, a data-length obtaining unit 65 and an upload unit 66.

The main difference between this embodiment and the fifth embodiment is: optionally, the system for resource download in this embodiment further includes the data-length obtaining unit 65, which is configured to obtain data length of the resource file if the hash server does not store with the full-text hash of the resource file corresponding to the download link URL; and the download unit 63 is further configured to adopt a respective download strategy based on whether or not the hash server stores with the head hash and the full-text hash of the resource file corresponding to the data length of the resource file.

Optionally, the download unit 63 includes an URL download module the 631 and a P2SP download module 632.

The URL download module 631 is configured to download the head data of the resource file via a source server if the hash server does not store with the full-text hash of the resource file corresponding to the download link URL; download the full text of the resource file via the source server if the hash server does not store with the full-text hash of the resource file corresponding to the head hash; or download the full text of the resource file via the source server if the hash server does not store with the head hash and the full-text hash of the resource file corresponding to the data length of the resource file.

The P2SP download module 632 is configured to perform the P2SP download if the hash server stores with the full-text hash of the resource file corresponding to the head hash; or perform the P2SP download if the hash server stores with the head hash and the full-text hash of the resource file corresponding to the data length of the resource file.

Optionally, the calculation unit 64 is further configured to calculate the full-text hash of the resource file downloaded by the download unit 63.

Optionally, the system in this embodiment further includes the upload unit 66, which is configured to upload the full-text hash of the resource file to the hash server; upload a corresponding relationship between the head hash and the full-text hash of the resource file to the hash server; or upload the head hash and a corresponding relationship between the full-text hash and the data length of the resource file to the hash server.

Optional, the hash server is configured to store the full-text hash of the resource file and the corresponding relationship between the download link URL and the full-text hash of the resource file; the corresponding relation between the head hash and the full-text hash of the resource file; or the head hash of the resource file and the corresponding relation between the data length and the full-text hash of the resource file.

To separate the different functions and thereby facilitating the optimization of the hash server when the resource file is large, optionally the hash server may include a download-link-to-hash (URL-Hash) mapping server and a head-to-full-text-hash mapping server.

The download-link-to-hash mapping server is configured to store the full-text hash of the resource file and the corresponding relationship between the download link and the full-text hash of the resource file.

The head-to-full-text-hash mapping server is configured to store the head hash of the resource file and the corresponding relationship between the data length and the full-text hash of the resource file.

The system for resource download of this embodiment is adapted to be used to the methods disclosed in the aforementioned second, third and fourth embodiments, and no redundant detail is to be given herein.

It is to be noted that the units in the disclosed in the aforementioned system embodiments are divided by way of functional logic only, and the present invention is not limited thereto. Further, these various functional units are named for being distinguished to each other, and the present invention is not limited thereto.

In addition, the ordinary skill in the art can understand that all or part of the steps in the aforementioned system embodiment can be implemented by program instructions and related hardware; wherein the program instructions may be stored in a computer readable storage medium, and the storage medium is, for example, a ROM/RAM, disk or optical disk, etc.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for resource download, comprising steps of:
through operation of at least one processor of a download client, obtaining a download link of a resource file and inquiring whether a full-text hash of the resource file corresponding to the download link is stored in a hash server;
if the full-text hash of the resource file corresponding to the download link is not stored in the hash server, through operation of at least one processor, downloading a head data of the resource file via a source server and calculating a head hash of the resource file; and
if a full-text of the resource file corresponding to the head hash is stored in the hash server, through operation of at least one processor adopting a first download strategy; if the full-text of the resource file corresponding to the head hash is not stored in the hash server, through operation of at least one processor adopting a second download strategy.

2. The method according to claim 1, wherein through operation of at least one processor adopting the first download strategy comprises: through operation of at least one processor performing a P2SP download; through operation of at least one processor adopting the second download strategy comprises: through operation of at least one processor downloading a full text of the resource file via the source server, through operations of at least one processor calculating the full-text hash of the resource file, and through operation of at least one processor uploading the full-text hash of the resource file and a corresponding relationship between the head hash and the full-text hash of the resource file to the hash server.

3. The method according to claim 2, further comprising a step of:
through operation of at least one processor performing the P2SP download according to the full-text hash of the resource file corresponding to the download link if the full-text hash of the resource file corresponding to the download link is stored in the hash server.

4. The method according to claim 1, further, if the full-text hash of the resource file corresponding to the download link is not stored in a hash server, comprising a step of:
through operation of at least one processor obtaining a data length of the resource file; and
if the full-text hash of the resource file corresponding to the head hash and the data length of the resource file is stored in the hash sever, through operation of at least one processor adopting a third download strategy; if the full-text hash of the resource file corresponding to the head hash and the data length of the resource file is not stored in the hash sever, through operation of at least one processor adopting a fourth download strategy.

5. The method according to claim 4, wherein through operation of at least one processor adopting the third download strategy comprises: performing a P2SP download; or
through operation of at least one processor adopting the fourth download strategy comprises: through operation of at least one processor downloading a full text of the resource file via a source server, through operation of at least one processor calculating the full-text hash and the data length of the resource file, and through operation of at least one processor uploading the full-text hash of the resource file, the head hash and a corresponding relationship between the full-text hash and the data length of the resource file to the hash server.

6. The method according to claim 5, further comprising a step of:
through operation of at least one processor performing a P2SP download according to the full-text hash of the resource file corresponding to the download link if the full-text hash of the resource file corresponding to the download link is stored in the hash server.

7. The method according to claim 1, further comprising a step of:
through operation of at least one processor performing a P2SP download according to the full-text hash of the resource file corresponding to the download link if a full-text hash of the resource file corresponding to the download link is stored in the hash server.

8. The method according to claim 4, further comprising a step of:
through operation of at least one processor performing a P2SP download according to the full-text hash of the resource file corresponding to the download link if the full-text hash of the resource file corresponding to the download link is stored in the hash server.

9. A system for resource download in download client, comprising:
one or more processors;

a memory operably coupled to the one or more processors; and a plurality of program units stored in the memory and configured to be executed by the one or more processors, wherein the plurality of program units further comprise:

a link obtaining unit configured to obtain a download link of a resource file;

an inquiring unit configured to inquire a hash server whether a full-text hash of the resource file corresponding to the download link is stored in a hash server and inquire the hash server whether the full-text hash of the resource file corresponding to a head hash thereof is stored in the hash server;

a download unit configured to, if the full-text hash of the resource file corresponding to the download link is not stored in the hash server, download a head data of the resource file via a source server; and if the full-text hash of the resource file corresponding to the head hash is stored in the hash sever, adopt a first download strategy; if a full-text hash of the resource file corresponding to the head hash is not stored in the hash sever, adopt a second download strategy; and a calculation unit configured to calculate the head hash of the resource file downloaded by the download unit.

10. The system according to claim 9, wherein the download unit is further configured to perform a P2SP download according to the full-text hash of the resource file corresponding to the download link if the full-text hash of the resource file corresponding to the download link is stored in the hash server.

11. The system according to claim 9, further comprising:

a data-length obtaining unit configured to obtain a data length of the resource file if the full-text hash of the resource file corresponding to the download link is not stored in a hash server, wherein the download unit is further configured to, if the full-text hash of the resource file corresponding to the head hash and the data length of the resource file is stored in the hash server, adopt a third download strategy; if the full-text hash of the resource file corresponding to the head hash and the data length of the resource file is not stored in the hash server, adopt a forth download strategy.

12. The system according to claim 11, wherein the download unit comprises:

a download-link download module configured to download a head data of the resource file via a source server if the full-text hash of the resource file corresponding to the download link is not stored in the hash server; further configured to download a full text of the resource file via the source server; calculate the full-text hash and the data length of the resource file, and upload the full-text hash of the resource file, the head hash and a corresponding relationship between the full-text hash and the data length of the resource file to the hash if the full-text hash of the resource file corresponding to the head hash and the data length of the resource file is stored in the hash server; and a P2SP download module configured to perform a P2SP download if the full-text hash of the resource file corresponding to the head hash and the data length of the resource file is not stored in the hash server, or if the full-text hash of the resource file corresponding to the head hash is not stored in the hash server.

13. The system according to claim 12, wherein the calculation unit is further configured to calculate the full-text hash of the resource file downloaded by the download unit.

14. The system according to claim 13, further comprising:

an upload unit configured to upload the full-text hash of the resource file to the hash server; upload the corresponding relationship between the head hash and the full-text hash of the resource file to the hash server; and upload the head hash and the corresponding relationship between the full-text hash and the data length of the resource file to the hash server.

15. The system according to claim 13, wherein the hash server is configured to store the full-text hash of the resource file and the corresponding relationship between the download link and the full-text hash of the resource file; the corresponding relationship between the head hash and the full-text hash of the resource file; and the head hash of the resource file and the corresponding relationship between the full-text hash and the data length of the resource file.

16. The system according to claim 13, wherein the hash server comprises:

a download-link-to-hash mapping server configured to store the full-text hash of the resource file and the corresponding relationship between the download link and the full-text hash of the resource file; and a head-to-full-text-hash mapping server configured to store the head hash of the resource file and the corresponding relationship between the data length and the full-text hash of the resource file.

* * * * *